United States Patent [19]

Tyler et al.

[11] 4,391,712

[45] Jul. 5, 1983

[54] REVERSE-OSMOSIS WATER PURIFIER APPARATUS AND METHOD

[75] Inventors: Truman V. Tyler; Robert B. Sprague, both of Long Beach, Calif.

[73] Assignees: Richard W. Beall, Jr., Manhattan Beach; Louis J. Favara, Thousand Oaks; Richard L. Gausewitz, Orange; Richard F. Carr, Orange; Allan Rothenberg, Orange; Elgin Edwards, Orange, all of Calif.

[21] Appl. No.: 285,456

[22] Filed: Jul. 21, 1981

[51] Int. Cl.³ .................... B01D 31/00; B01D 13/00
[52] U.S. Cl. .................... 210/652; 210/134; 210/136; 210/433.2; 210/257.2
[58] Field of Search .............. 210/101, 110, 134, 136, 210/137, 652, 321.1, 433.2, 257.2

[56] References Cited

U.S. PATENT DOCUMENTS

| 4,021,343 | 5/1977 | Tyler | 210/110 |
| 4,176,063 | 11/1979 | Tyler | 210/101 |

FOREIGN PATENT DOCUMENTS

| 2180436 | 11/1973 | France | 210/257.2 |

*Primary Examiner*—Frank A. Spear, Jr.
*Attorney, Agent, or Firm*—Gausewitz, Carr, Rothenberg & Edwards

[57] ABSTRACT

An apparatus and method whereby after a reverse-osmosis water purifier system has been shut down, the first quantity of water, which emanates from the reverse-osmosis filter, does not flow through the pure water storage tank but instead to the drain. Therefore, the water in the reverse-osmosis filter, and which has become contaminated as the result of standing in the filter so that a substantial amount of osmosis can occur, does not contaminate the pure water in the storage tank or system but instead is discarded.

7 Claims, 5 Drawing Figures

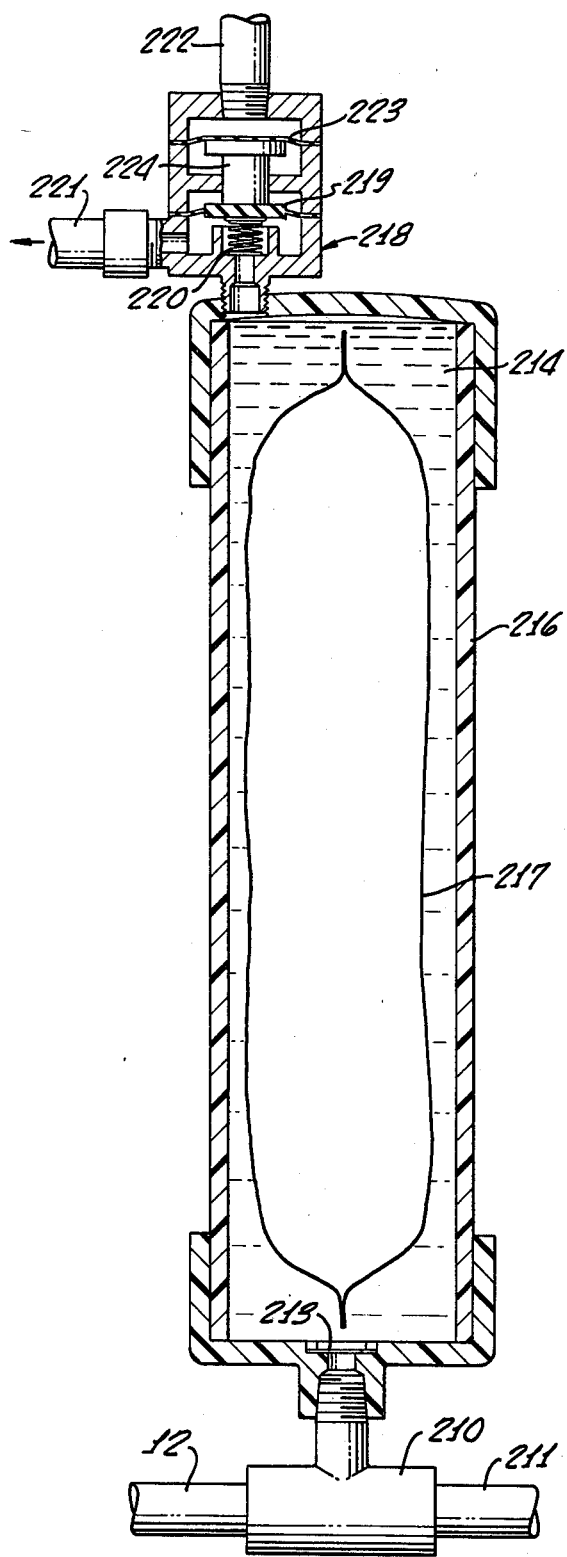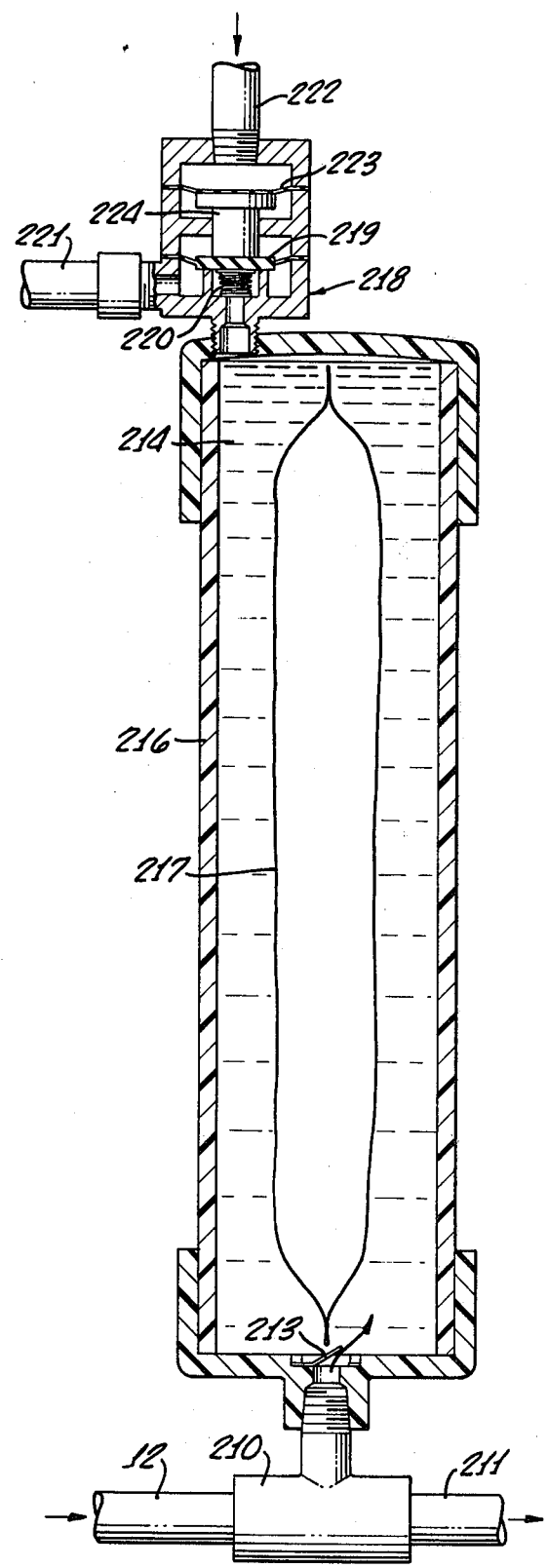

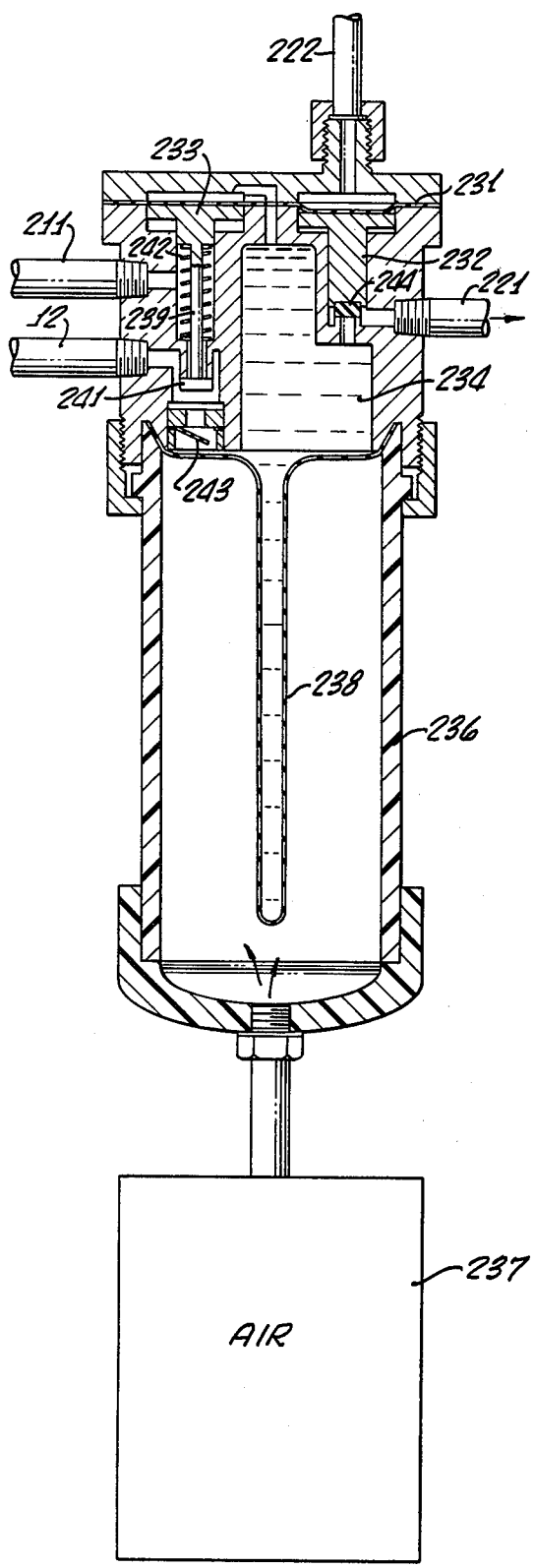
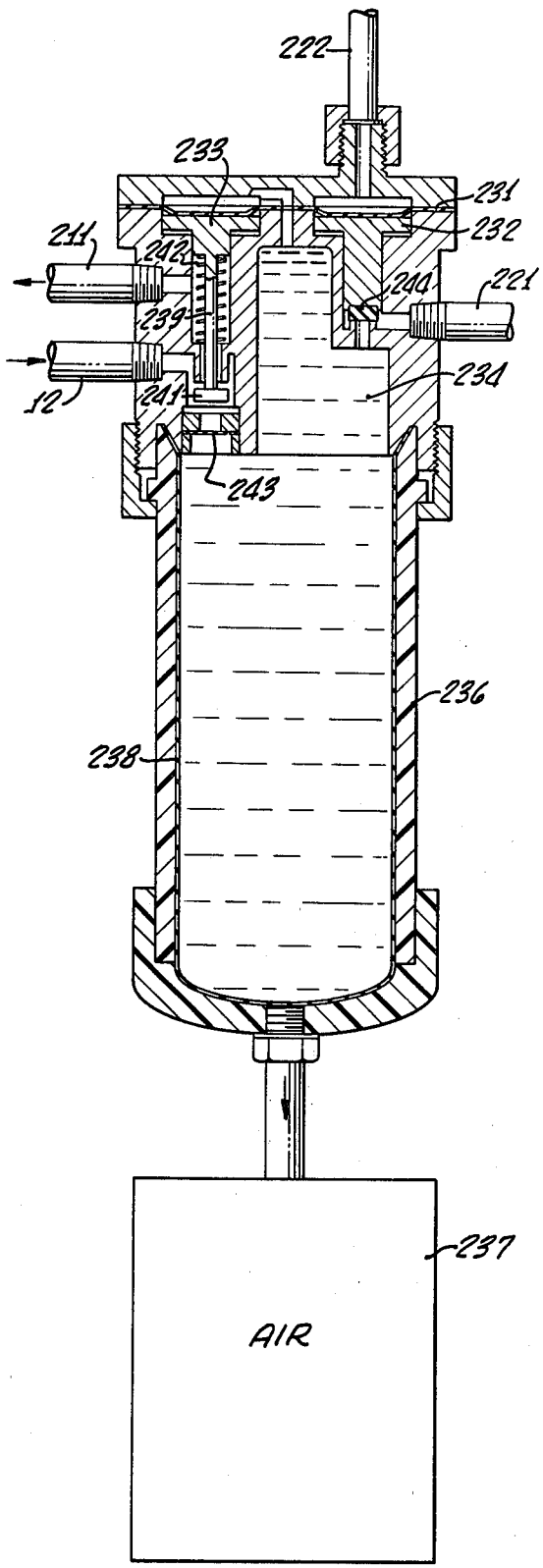

REVERSE-OSMOSIS WATER PURIFIER APPARATUS AND METHOD

BACKGROUND OF THE INVENTION, AND DESCRIPTION OF PRIOR PATENTS

Prior U.S. Pat. No. 4,176,063 discloses a reverse-osmosis water purifier, which is commercially practical, and which does not use water after the pure water storage tank is filled. In contrast to such system, there are on the market systems which never shut off, even after the storage tank is filled, so that even a small home unit may waste thousands of gallons of water per month. A problem which exists relative to water-saving systems of the type shown in such U.S. Pat. No. 4,176,063, and in an earlier U.S. Pat. No. 4,021,343, is that after shut down of the system, the pure water standing on the pure water side of the reverse-osmosis membrane becomes contaminated with salts which perminate the membrane due to the osmotic pressure on the salt water side. Then, when the system starts up again, this contaminated "pure" water flows into the pure water storage bag to reduce substantially the purity of the water therein.

SUMMARY OF THE INVENTION

In the present apparatus and method, a predetermined first quantity of water emanating from the pure water side of the reverse-osmosis unit, after water is drawn from the pure water storage element following a period of shutdown of the system, is not conducted to the pure water storage element. Such predetermined first quantity is, preferably, selected to be substantially the same as the amount of pure water which stands in the pure water side of the reverse-osmosis membrane during the interval of shutdown. "Shutdown" of the system occurs when there is a predetermined quantity of water in the pure water storage tank, such predetermined quantity preferably being such that the tank is full. Valve and accumulator means are provided for receiving and storing, under pressure, the first quantity of water discharged from the reverse-osmosis unit subsequent to shutdown. Then, as soon as the system shuts down again, the stored water is discharged automatically to a drain. The system is closed at all times, there being no possibility of contamination of the water which passes to the storage tank.

In accordance with the first embodiment, the accumulator means is a bag containing air or other gas, and the first quantity of water is stored outside the bag. In accordance with a second embodiment, there is bag or bladder which is filled with the first quantity of water, and the accumulator means is exterior thereto in either the same or a separate housing.

BRIEF DESCRIPTION OF THE DRAWINGS

FIGS. 2 and 3 are enlarged vertical sectional views of the lower-right portion of the showing of FIG. 1, illustrating in different positions the preferred form of large portions of the apparatus for storing and later discharging the first quantity of water from the filter; and FIGS. 4 and 5 illustrate in different positions a second embodiment of the storing and discharging means.

DETAILED DESCRIPTION OF THE PREFERRED EMBODIMENTS

Figure 1:
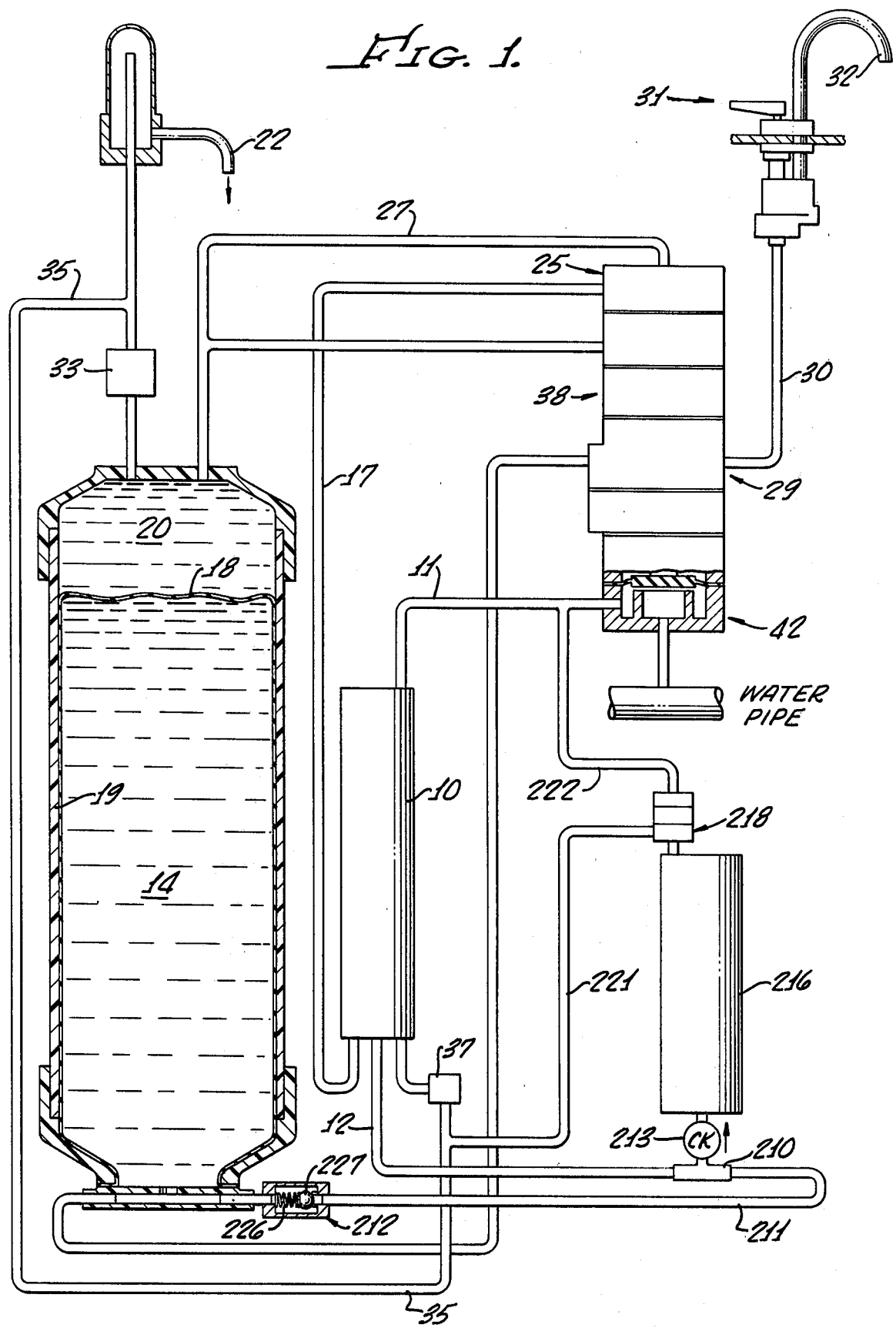
FIG. 1 is a schematic showing of an entire reverse-osmosis water purifier system for home use, and containing the preferred valve and accumulator means for storing and subsequently discharging the first quantity of water from the filter.

The entire disclosure of U.S. Pat. No. 4,176,063 is hereby incorporated by reference herein and made a part hereof as if set forth in full. In the production model and preferred form of the apparatus, the embodiment of FIGS. 7 and 8 of said patent is employed without any constrictor 33, and is combined with the embodiment of FIGS. 2 and 3 of the present application. However, for purposes of simplicity of description, the embodiment of FIG. 1 of said patent is employed and described in combination first with the embodiment of FIGS. 2 and 3 of the present application (this being the preferred embodiment of the present invention), and then as combined with the embodiment of FIGS. 4 and 5 of the present application.

Referring to FIG. 1, there is shown a pure water storage chamber 14 adapted to change in size in accordance with external pressure. Preferably, chamber 14 is defined by a bladder 18 which is contained within a rigid tank 19. The portion of tank 19 exterior to bladder 18 is a squeeze chamber 20 into which pressurized water is adapted to be introduced in order to pressurize chamber 14 and thus expel pure water therefrom through a check valve 29 (upper-right portion of drawing) to a single tube 30 leading to a manually-operated outlet valve 31 and thus a spout 32. Chamber 14 is refilled, slowly, by pure water emanating from the pure water outlet of a reverse-osmosis (R.O.) unit 10. Stated more specifically, a pure water outlet is numbered 12 and connects through a Tee 210 to a tube 211, the latter being connected through a loaded check valve 212 to the pure water chamber 14.

At all times, except when bladder 18 is filled to a predetermined extent (preferably to capacity, the bladder then engaging all portions of the interior wall of tank 19), an inlet valve 42 from a pressurized water pipe is in open condition. Pressurized water from a water main then flows through a tube 11 to the inlet of R.O. unit 10. Some of this water washes the membrane within unit 10 and then passes through a proportioning valve 37 to a tube 35 leading to a drain 22. Periodically, when outlet valve 31 is opened to draw off pure water, a pilot valve 38 operates a squeeze valve 25 to inject pressurized "squeeze water" from unit 10 (on the upstream side of the membrane therein) through tubes 17 and 27 to squeeze chamber 20 to pressurize bladder 18.

After bladder 18 has filled completely, the pressure built up in pure water chamber 14 causes inlet valve 42 to close. All flow of water through filter 10 then ceases, which cessation may continue for hours or even days. It is not until outlet valve 31 is again opened to draw off water through spout 32 that flow of water recommences. By this time, however, especially after a long period of shutdown, that water on the downstream side of the membrane in R.O. unit 10 will have become contaminated by salts transferred thereto by osmosis from the portion of unit 10 on the upstream side of the membrane therein. There will next be described, with particular reference to the lower-right portion of FIG. 1, and FIGS. 2 and 3, the apparatus for preventing such contaminated "pure" water from reaching storage tank 14.

The Tee 210 in tubes 12 and 211 connects through a check valve 213 to a discharge chamber 214. Chamber 214 is defined by a (preferably) rigid housing 216 containing a sealed bladder 217. Bladder 217 is, preferably, formed of substantially unstretchable, flexible synthetic resin, and is substantially filled with air or other gas.

Communicating with chamber 214 is a shut-off valve 218, being preferably a diaphragm valve, the diaphragm 219 of which is urged toward open position by a spring 220. When valve 218 is opened, water may pass from chamber 214 to a tube 221 leading to drain tube 35.

At all times when inlet valve 42 (FIG. 1) is open, shut-off valve 218 is maintained closed. This is done by connecting a tube 222 to tube 11 and thus pressurize the space above a diaphragm 223 (FIGS. 2 and 3). A piston 224 is thus forced downwardly to maintain diaphragm 219 closed on its seat, despite the pressure of spring 220.

OPERATION, EMBODIMENT OF FIGS. 2 AND 3

Assume that pure water chamber 14 is full, so that inlet valve 42 has closed to shut down the system. When outlet valve 31 is then operated to draw water from spout 32, inlet valve 42 opens to transmit pressure through tube 222 to a space above piston 224 (FIG. 2). Diaphragm 219 is then forced downwardly to shut the valve 218 and prevent outflow from chamber 214.

Water also flows from valve 42 through tube 11 to R.O. unit 10, causing discharge of "pure" water through tube 12, but such "pure" water has (if the unit has been shut down for a substantial length of time) been contaminated by salts. This contaminated water will not flow from tube 12 to tube 211 and thus tank 14, because the loaded check valve 212 has sufficient bias to prevent such flow at this time. Stated more specifically, a spring 226 (FIG. 1) has sufficient force to press a ball 227 on its seat, until the pressure in tube 211 builds up to (for example) about 15 psi. The pressure in discharge chamber 214 is much lower than this, so the initial quantity of water from R.O. unit 10 passes through check valve 213 (FIG. 2) to chamber 214 and fills it, pressurizing the air in bladder 217 and decreasing the size of such bladder. The bladder will not rupture, though it has not great strength, because there are equal pressures inside and out at all portions thereof. Bladder 217 and the surrounding structure operate as a hydraulic pressure accumulator.

When the discharge chamber 214 is substantially filled, bladder 217 being relatively compressed, pressure in line 211 will have built up to (for example) the 15 psi required to open check valve 212. This will not occur until after R.O. unit 10 and tube 12 have been purged of all contaminated "pure" water, since the size of chamber 214 is selected to accomplish this result. For example, in a home unit having a relatively small R.O. unit 10, about 6 oz. of water may be contained within housing 216 exterior to bladder 217. No contaminated water may flow from discharge chamber 14 downwardly to line 211 because the check valve 213 prevents it.

After pure water chamber 14 has again filled, inlet valve 42 closes. R.O. unit 10 then depressurizes through the proportioning valve 37 and tube 35 to drain 22. There is then insufficient pressure in tube 222 to maintain valve 218 open against the bias of its spring 220. The opened valve (FIG. 3) permits discharge of water from discharge chamber 214 to tube 221 leading to the drain. The water is expelled due to expansion of bladder 217, and may also be discharged by gravity when valve 218 is at the bottom of the apparatus as is preferably the case.

EMBODIMENT OF FIGS. 4 AND 5

The apparatus shown in FIGS. 4 and 5 is substituted for that of FIGS. 2 and 3, and is connected to the same tubes 12, 211, 221, and 222 of FIG. 1. The check valve 212 of FIG. 1 need not be loaded by any spring, but may instead be a simple check valve (such as valve 13 of patent 4,176,063).

A diaphragm 231 extends across two pistons 232 and 233 in a suitable housing. At the region above piston 232, the space above the diaphragm communicates through tube 222 to the water inlet (when inlet valve 42 is open). The space above piston 233, and over diaphragm 231, communicates through an internal passage with a chamber 234 in a (preferably) rigid housing 236. The latter communicates through a tube with an accumulator housing 237 containing air under relatively low pressure. A bag 238, preferably formed of synthetic resin, is mounted in housing 236 and communicates at its mouth with chamber 234.

Piston 233 connects through a rod 239 with a valve head 241, the connection being through an oversized opening in a valve seat. A spring 242 presses piston 233 and thus valve head 241 upwardly. The region immediately beneath piston 233 communicates with tube 211 leading to pure water chamber 14. Tube 12, from R.O. unit 10, communicates with the space below valve head 241, there being a check valve 243 permitting downflow of water from such space into bag 238, but preventing upward flow therefrom.

OPERATION, EMBODIMENT OF FIGS. 4 AND 5

Piston 232 has at its lower end a valve element 244 which is forced downwardly by the piston when inlet valve 42 is open. This closes a discharge passage from chamber 234 to drain tube 221. Thus, at all times, except when bladder 14 is full, valve element 244 prevents outflow to drain 221. Such outflow is prevented in both FIGS. 4 and 5.

Referring to FIG. 4, this shows the condition when chamber 234 and bag 238 are first being filled by water from tube 12 after a period of shutdown of the system. The "pure" water containing excessive salts passes downwardly through check valve 243 into chamber 234 and bag 238, and cannot pass upwardly to tube 211 since valve head 241 is then held seated by spring 242. The bag 238 thus fills against the pressure of the air in housing 237 and in the portion of housing 226 exterior to the bag. Finally, the pressure in chamber 234 is sufficiently great to build up the pressure over piston 233 enough to force such piston downwardly, against the bias of spring 242, thus moving valve head 241 away from its seat, as shown in FIG. 5. Thereafter, the pure water from tube 12 flows upwardly around rod 239 into the chamber containing spring 242, and thence through tub 211 to pure water chamber 14.

After chamber 14 is full, causing closing of inlet valve 42 and depressurization of R.O. unit 10, piston 232 is no longer held down and therefore moves upwardly to lift valve element 244. This permits discharge to drain of the contaminated "pure" water from chamber 234 and bag 238, due to the gas pressure in housing 237 and the connecting chamber. After such discharge of water to drain tube 221 has occurred, there is a low pressure in chamber 234, and this pressure is communicated to the space above piston 233 and diaphragm 231. Then, spring 244 forces piston 233 upwardly to the position of FIG. 4. The apparatus is then ready for another cycle of operation.

The foregoing detailed description is to be clearly understood as given by way of illustration and example only, the spirit and scope of this invention being limited solely by the appended claims.

What is claimed is:

1. A reverse-osmosis water purification system which saves water yet is not subject to reduced purity due to osmosis during periods of shutdown, said system comprising:
   (a) a reverse-osmosis unit, said unit having first outlet means from the pure water side thereof, and second outlet means from the waste water side thereof,
   (b) valve means to start and stop flow of water through said unit,
   (c) storage means to receive pure water from said first outlet means,
   (d) an outlet valve to discharge pure water from said storage means,
   (e) means, responsive to filling of said storage means to a predetermined level, to effect closing of said valve means(b),
   (f) means to divert the "pure" water emanating from said first outlet means, so that said "pure" water does not reach said storage means, during a period commencing upon reopening of said valve means (b),
   said means including hydraulic accumulator means associated with said diverter means (f) to receive "pure" water therefrom and store the same,
   said accumulator means having a capacity at least about equal to that of said pure-water side of said reverse-osmosis unit, and
   (g) means to terminate said period of water diversion after said accumulator means has been substantially filled with water which has been contaminated with salts due to osmosis from the waste water side of said unit, during shutdown of said unit by said valve means (b), whereby the only water reaching said storage tank, either immediately after shutdown or subsequently thereto, is pure.

2. The invention as claimed in claim 1, in which said accumulator means comprises a housing connected to receive "pure" water from said diverter means (f), and a gas-filled bag disposed in said housing for compression of the gas in said bag as said housing fills.

3. The invention as claimed in claim 2, in which said accumulator means is adapted to discharge upon closing of said valve means (b), said discharge being in response to expansion of said bag.

4. The invention as claimed in claim 1, in which said accumulator means automatically discharges in response to closing of said valve means (b).

5. The invention as claimed in either of claims 1 or 2, in which check-valve means are interposed between said first outlet means and said storage means, said check-valve means being loaded so as not to open until the pressure on the upstream side of said check-valve means is relatively high, and in which said accumulator means is so connected as to fill prior to the time said upstream pressure becomes thus high.

6. A reverse-osmosis water purification system that saves water and does not deliver partially contaminated water to a storage tank during periods following shutdown, said system comprising:
   (a) a reverse-osmosis unit,
   said unit having first outlet means from the pure water side thereof, and second outlet means from the waste water side thereof,
   (b) storage means to receive pure water from said first outlet means,
   said storage means having a movable wall and being disposed within a housing,
   (c) an outlet valve to discharge water from said storage means to a point of use,
   (d) squeeze valve means, responsive to opening of said outlet valve, to introduce pressurized squeeze water into said housing containing said storage means, whereby to apply external pressure to said storage means and effect discharge of pure water therefrom through said outlet valve to a point of use,
   (e) shutoff valve means to start and stop flow of water through said reverse-osmosis unit,
   said shutoff valve means being closed in response to a condition at which said storage means has filled,
   said shutoff valve means being opened in response to decreased water in said storage means following opening of said outlet valve,
   (f) hydraulic accumulator means to receive "pure" water from said first outlet means of said reverse-osmosis unit during a period of time immediately following a time when both of the following conditions have occurred:
   1. said storage means has filled to effect closing of said shut-off valve means, and
   2. said outlet valve means has later opened to reduce the amount of water in said storage means and to effect opening of said shut-off valve means, and
   (g) means to discharge said accumulator means to a region other than said storage means in response to a filled condition of said storage means and consequent closing of said shutoff valve means.

7. A method of maintaining the purity of the water in the pure-water storage means of a reverse-osmosis water purification system of the type which shuts down automatically when said pure-water storage means has been filled to its capacity by water emanating from the pure-water outlet of a reverse-osmosis filter unit, and which starts operating automatically when water is thereafter drawn out of said pure-water storage means, said method comprising:
   (a) diverting to an accumulator a predetermined quantity of water which emanates from the pure-water outlet of the reverse-osmosis filter unit following a period of shutdown,
   said predetermined quantity being at least about equal to the pure-water capacity of said filter unit,
   said diverting commencing when water is drawn out of said pure-water storage means,
   (b) ceasing said diverting when said accumulator has received said predetermined quantity, so that water then flows from said pure-water outlet to said pure-water storage means, and
   (c) dumping said accumulator when said pure-water storage means has filled to its capacity,
   said diverting, said ceasing of said diverting, and said dumping being effected automatically, in the absence of any manual operation.

* * * * *